May 29, 1934.　　　　　H. STIBBS　　　　　1,960,719
CONVEYER DRIVE
Filed Feb. 10, 1931　　2 Sheets-Sheet 2

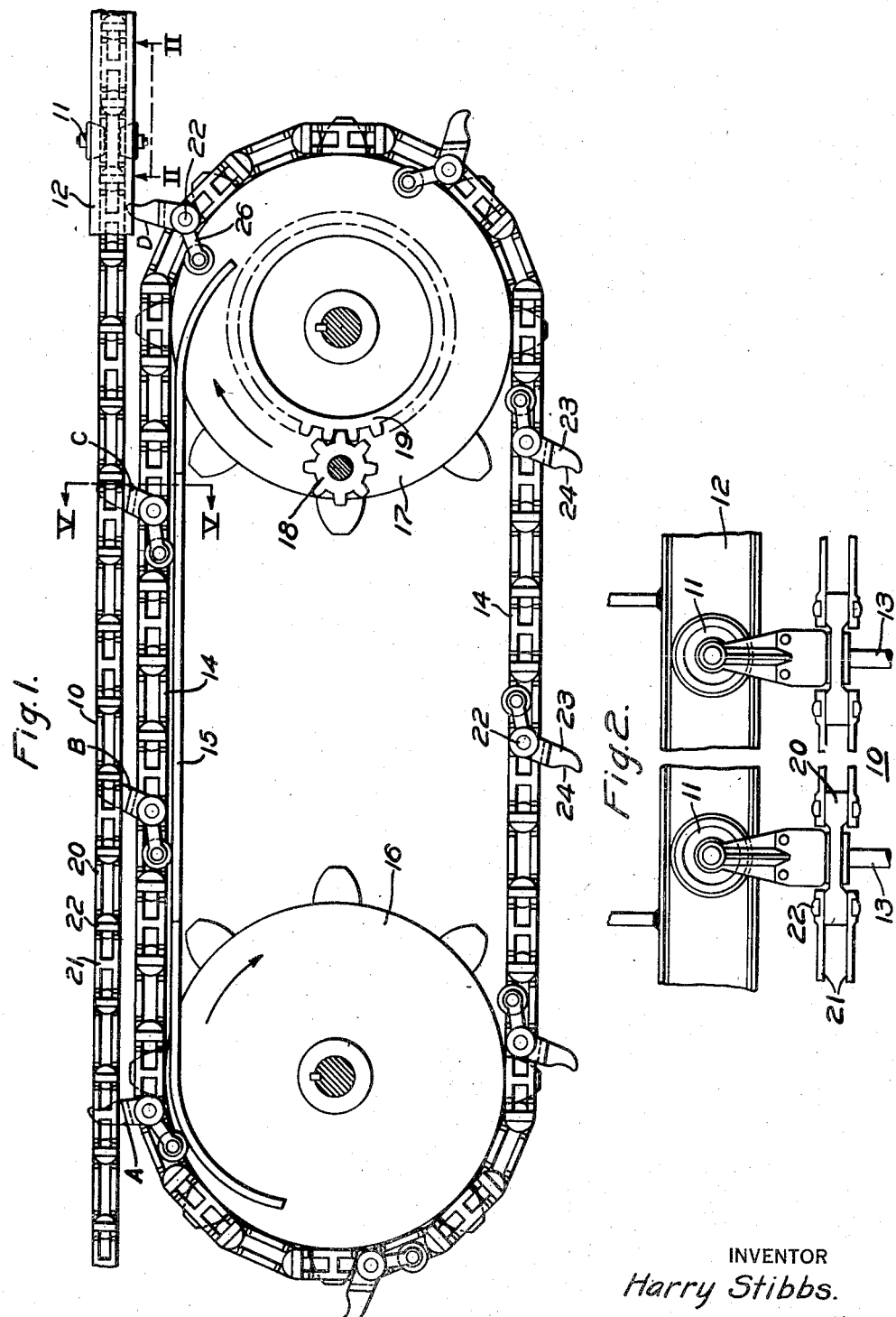

INVENTOR
Harry Stibbs.
BY
ATTORNEY

Patented May 29, 1934

1,960,719

UNITED STATES PATENT OFFICE 1,960,719

CONVEYER DRIVE

Harry Stibbs, Vandalia, Ohio

Application February 10, 1931, Serial No. 514,798

8 Claims. (Cl. 198—203)

My invention relates to conveyer systems and particularly to an improved form of drive therefor.

Two types of drives are in common use for conveyers, particularly mono-rail conveyers, at the present time, one being the "corner-sprocket" drive and the other being the "endless chain" drive.

The corner-sprocket drive is satisfactory except for the fact that it can be employed only where there is a turn in the conveyer. This imposes a serious limitation on this type of drive since the location of the turn and the point where a driving unit for the system is needed may not coincide.

The endless chain drive may be located at almost any point in the conveyer system and, for this reason, has a decided advantage over the corner-sprocket drive. In the past, endless chain drives have been so constructed that the driving dog of the endless chain does not exert a driving force in the line of motion of the conveyer chain. Consequently, it has been necessary to employ a "back-up" bar to prevent the conveyer chain from being forced away from the endless drive and out of engagement with the driving dogs.

This "back-up" bar causes an undesirable amount of wear on the chain. It also causes so much friction that a large amount of power is wasted in driving the conveyer chain.

A further disadvantage of prior endless chain drives is that the dogs crowd or "bite into" the conveyer chain when they engage and disengage the chain.

An object of my invention is to provide an endless chain drive so designed that the driving force applied to the conveyer chain is directly in line with the line of motion of the conveyer chain.

A further object of my invention is to provide an endless chain drive in which the driving dogs engage and disengage the conveyer chain without crowding or "biting into" the links of the chain.

A still further object of my invention is to provide an endless chain drive in which the power is applied evenly to the conveyer chain.

In practicing my invention I pivot the driving dogs on the drive chain and provide each dog with an arm which is in contact with a track or cam. The cam is so shaped that the dogs engage and disengage the conveyer chain at the proper time to apply the driving force smoothly thereto.

Figure 3:
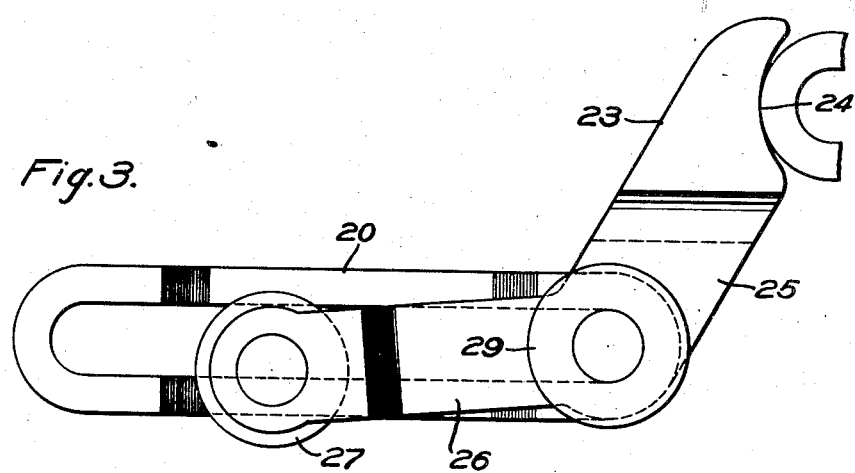
Figure 4:
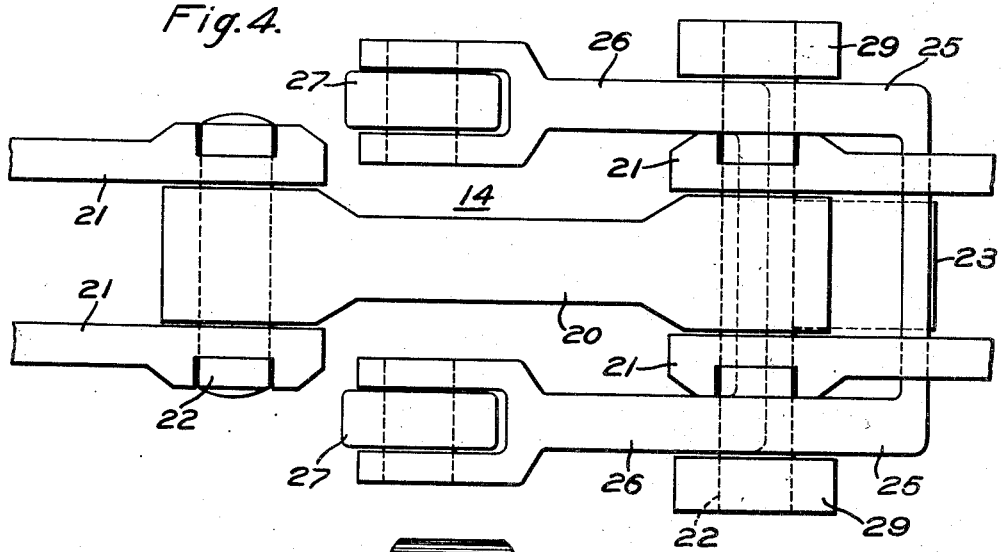
Figure 5:
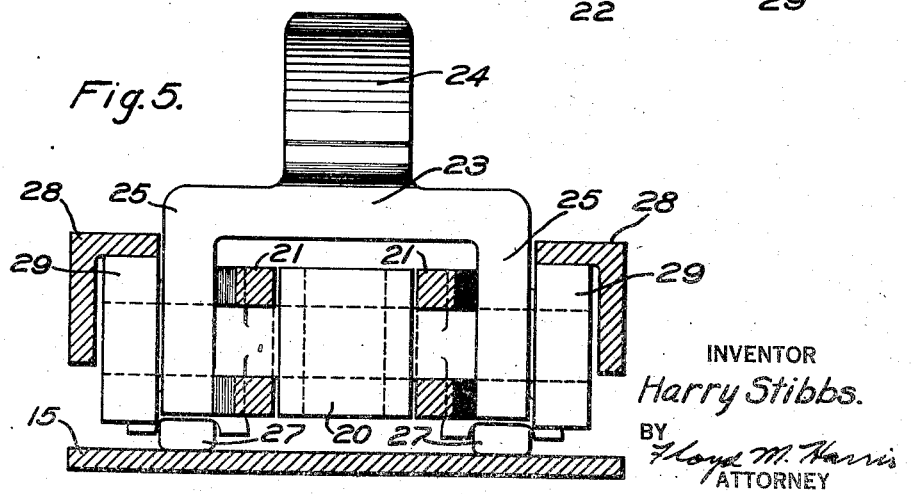

Other features and advantages of my invention will appear from the following description taken in connection with the accompanying drawings in which, Figure 1 is a plan view of a conveyer drive constructed in accordance with my invention, Fig. 2 is a view taken on the line II—II of Fig. 1, Fig. 3 is a plan view of one of the driving dogs shown in Fig. 1, Fig. 4 is a side view of the driving dog shown in Fig. 3, Fig. 5 is a view taken on the line V—V of Fig. 1.

Referring to Figs. 1 and 2 of the drawing, the conveyer comprises a conveyer chain 10 which is attached to trolleys 11 supported by a mono-rail track 12 in the form of an I-beam. The objects to be carried by the conveyer are supported by means of the trolley rods 13.

As shown in Fig. 1, the conveyer chain 10 is driven by means of a plurality of dogs A, B, C, D, etc., pivotally fastened to an endless chain 14. Their position is controlled by means of a track or cam 15. The chain 14 is supported at one end by the sprocket wheel 16 and is supported and driven at the other end by means of the sprocket wheel 17. Power is applied to the sprocket wheel 17 through the pinion 18 which meshes with a gear wheel 19 fastened to the sprocket wheel 17.

Both the drive chain 14 and the conveyer chain 10 are of a well known construction, each section comprising a center link 20 and two side links 21. The links are held together by means of pins 22. This type of chain is disassembled by moving the pin to the middle of the center link and turning the pin a quarter turn.

The structure of the driving dogs is shown more clearly in Figs. 3 to 5. Each dog comprises a member 23 having a curved face 24 for engagement with one end of a center link 20 of the conveyer chain 10. Two dog arms 25 extend from the member 23 and these arms are pivoted on the ends of one of the pins 22 of the drive chain, the pin being made long enough for that purpose.

The dog arms 25 are extended beyond the pin 22 at an angle to form the cam arms 26. The cam arms 26 have rollers 27 mounted on their ends for making a rolling contact with the cam 15.

As shown in Fig. 5, angle irons 28 (not shown in Fig. 1) may be placed above rollers 29 mounted on the ends of the pin 22 to prevent the drive chain from jumping away from the cam track 15.

The curved face 24 of the dog is an important feature of my invention since it prevents the end of a center link of the conveyer chain from slipping back and forth on the dog. This eliminates the necessity of providing guides or "back-up" bars in frictional engagement with the conveyer chain 10. The radius of curvature of the cam face 24 preferably is slightly greater than that of the end of the center link with which it makes contact.

The cam track 15 is split at each end to provide clearance for the sprocket wheels 16 and 17. With this arrangement a sprocket wheel is between the two sections of the cam and between the cam arms 26 of the dog passing around the sprocket wheel.

The operation of the conveyer drive is apparent from an inspection of Fig. 1. As the dog A is moved upward between the side links 21 of the conveyer chain 10, the curved end of the cam track 15 causes the dog to tilt to the right so that it is brought into engagement with the end of a center link after it is in such position as to drive in line with the line of motion of the chain 10. The dogs B and C are shown in this driving position. In this position, in which the driving force of the dog coincides with the line of motion of the conveyer chain, the face 24 makes contact with the link 20 as shown in Fig. 3.

The right end of the cam track 15 is so shaped that the cam arm 26 drops down to bring the dog D away from the end of the center link before the pin 22 on which the dog D is pivoted drops below the driving position shown for dogs B and C. The cam arm 26 then drops down more rapidly than does the dog pin 22 so that the dog D is moved away from the center link as the dog follows the circumference of the sprocket wheel 17. As a result, the dog D disengages the conveyer chain 10 without crowding or "biting in."

Various modifications may be made in my invention without departing from the spirit and scope thereof, and I desire, therefore, that only such limitations shall be placed thereon as are imposed by the prior art and are set forth in the appended claims.

I claim as my invention:

1. In an overhead conveyer system including a flexible conveyer chain, means for driving said conveyer chain comprising an endless flexible chain positioned in a horizontal plane having dogs pivoted thereon which, in their driving position, engage said conveyer chain, the surface of each dog which engages said chain being concave, said concave surface having a radius of curvature greater than that of the chain surface with which it makes contact, and means for causing said dogs to drive always with their driving force in line with the line of motion of said chain.

2. In a mono-rail conveyer system having a conveyer chain supported by trolleys running on a track, a drive for said conveyer chain, said drive comprising an endless chain positioned in a horizontal plane and supported by sprocket wheels, said endless chain having sections consisting of a center link and two side links, a dog having arms extending therefrom and having a concave driving surface, an arm being positioned on each side of said endless chain, a pin coupling a center link and two side links and extending through said arms, a cam track so positioned with respect to said arms that during a portion of their travel they come into contact therewith to hold the dog in driving engagement with said conveyer chain, rollers at the ends of said pin coupling, and a second track against which said rollers may come into contact, said rollers being free to move away from said second track at all times.

3. In a conveyer system including a flexible conveyer chain, means for driving said conveyer chain comprising an endless flexible chain positioned in a horizontal plane and having dogs pivoted thereon which, in their driving position, engage said conveyer chain, each dog having a cam arm extending therefrom, a cam track with which said cam arms are in contact when the dogs are in their driving positions, rollers mounted at the pivot points of said dogs, and a second track with which said rollers may come into contact when the dogs are in their driving position, said tracks and said cam arm being so positioned with respect to each other that said rollers cannot simultaneously make contact with both of said tracks, and said cam track further being so positioned with respect to said cam arms that during a portion of their travel they come into contact therewith to bring the dog into driving engagement with said conveyer chain.

4. In a conveyer system including a flexible conveyer chain, means for driving said conveyer chain comprising an endless flexible chain having dogs pivoted thereon which, in their driving position, engage said conveyer chain, each dog having a cam arm extending therefrom, a cam track with which said cam arms come into contact to hold the dogs in driving engagement with said conveyer chain, contact members mounted at the pivot points of said dogs, and means comprising a second track with which said contact members may come into contact for limiting the movement of said endless flexible chain toward said conveyer chain, said tracks being so positioned with respect to said contact members that a contact member cannot be in contact with both tracks at the same instant.

5. In a conveyer system including a conveyer chain comprising center links fastened together by side links and connecting pins, means for driving said conveyer chain comprising an endless flexible chain having dogs pivoted thereon which, in their driving position, engage the ends of said center links, and means for causing the driving force of said dogs to coincide with the line of motion of said conveyer chain and to cause them to engage and disengage said center links while said driving force coincides with said line of motion, said driving surface being concave and having a greater radius of curvature than the end of the center link with which it makes contact.

6. In an overhead conveyer system including a flexible conveyer chain, means for driving said conveyer chain comprising an endless flexible chain supported by sprocket wheels positioned in a horizontal plane, said endless chain having dogs pivoted thereon which, in their driving position, engage said conveyer chain at evenly spaced points, each dog having an arm which extends rearwardly therefrom as said conveyer chain is being driven, and a cam track so positioned with respect to said arms that during a portion of their travel they come into contact therewith to hold the dog in driving engagement with said conveyer chain, said cam track being curved away from said conveyer chain at each end whereby said dogs are caused to engage and disengage said conveyer chain gradually, the curved portion of said cam track being so positioned with respect to said sprocket wheels that the pivot point of a dog is as close as possible to said conveyer chain at the time that said dog engages and disengages said conveyer chain.

7. In a conveyer system including a flexible conveyer chain, means for driving said conveyer chain comprising an endless flexible chain positioned in a horizontal plane and having dogs pivoted thereon which, in their driving position, engage said conveyer chain, each dog having an arm extending therefrom and having a concave driving surface, said concave surface having a radius of curvature greater than that of the chain surface with which it makes contact, a cam track with which said cam arms are in contact when the dogs are in their driving position, said cam track having a curved portion with which said cam arms come into contact to cause said dogs to engage said conveyer chain, the curved portion of said cam track being so related to the curved driving surface of said dogs that said dogs engage said conveyer chain only when they are in position to exert a driving force in the line of motion of said conveyer chain.

8. In a conveyer system including a flexible conveyer chain, means for driving said conveyer chain comprising an endless flexible chain having dogs pivoted thereon, each of said dogs having a driving surface which makes contact with a surface of said conveyer chain when the dog is in its driving position, both said driving surface and said chain surface being curved, one of said surfaces being concave and the other of said surfaces being convex, said concave surface having a greater radius of curvature than said convex surface, and means for causing said dogs to drive always with their driving force in line with the line of motion of said chain.

HARRY STIBBS.